(12) United States Patent
Koike et al.

(10) Patent No.: US 7,340,382 B2
(45) Date of Patent: Mar. 4, 2008

(54) LENS ARRAY AND DISPLAY APPARATUS USING SAME

(75) Inventors: Takafumi Koike, Sagimihara (JP); Michio Oikawa, Sagamihara (JP)

(73) Assignee: Hitachi Displays, Ltd., Mobara-shi, Chiba (JP)

( * ) Notice: Subject to any disclaimer, the term of this patent is extended or adjusted under 35 U.S.C. 154(b) by 0 days.

(21) Appl. No.: 11/326,740

(22) Filed: Jan. 5, 2006

(65) Prior Publication Data
US 2006/0195293 A1   Aug. 31, 2006

(30) Foreign Application Priority Data
Feb. 28, 2005   (JP)   ............................ 2005-052248

(51) Int. Cl.
*G06F 15/00* (2006.01)
*G01B 11/00* (2006.01)

(52) U.S. Cl. ...................... 702/194; 702/159
(58) Field of Classification Search ................ 702/194
See application file for complete search history.

(56) References Cited

U.S. PATENT DOCUMENTS

| 7,070,278 | B2 * | 7/2006 | Pezzaniti | 353/7 |
|---|---|---|---|---|
| 2003/0016444 | A1 * | 1/2003 | Brown et al. | 359/462 |
| 2005/0211885 | A1 * | 9/2005 | Tobiason et al. | 250/231.13 |
| 2007/0183033 | A1 * | 8/2007 | Schwerdtner | 359/463 |

FOREIGN PATENT DOCUMENTS

JP   07-007747 A   1/1995

* cited by examiner

*Primary Examiner*—John Barlow
*Assistant Examiner*—Cindy Khuu
(74) *Attorney, Agent, or Firm*—Townsend and Townsend and Crew LLP

(57) ABSTRACT

In an autostereoscopic display, a horizontal view range can be widened without reducing two-dimensional resolutions. Lenses are arranged to be a linear combination having integer coefficients of two unit vectors, thereby to control the vertical and horizontal view ranges.

6 Claims, 10 Drawing Sheets

LENS ARRAY AND DISPLAY APPARATUS USING SAME

BACKGROUND OF THE INVENTION

1. Field of the Invention

The present invention relates to a lens arranging method for a lens array, and more specifically, to an autostereoscopic display apparatus using a light beam control device, such as a lens array.

2. Description of the Related Art

An autostereoscopic display apparatus (or, "autostereoscopic display," hereafter) is capable of providing stereoscopic images that an observer can observe without using a special device such as glasses. Various methods for the autostereoscopic display are known including, for example, lenticular methods and holography methods. Basic principles of most of such methods are common in that light beam information incident on eyes of an observer is controlled to cause different types of light beam information are incident on the left and right eyes of the observer, whereby an autostereoscopic is implemented. As one method of autostereoscopic display, an integral photography method is known (see M. G. Lippmann, Epreuves reversibles donnant la sensation du relief, pp. 821-825, Vol. 7, J. de Phys, 1908).

Figure 1:
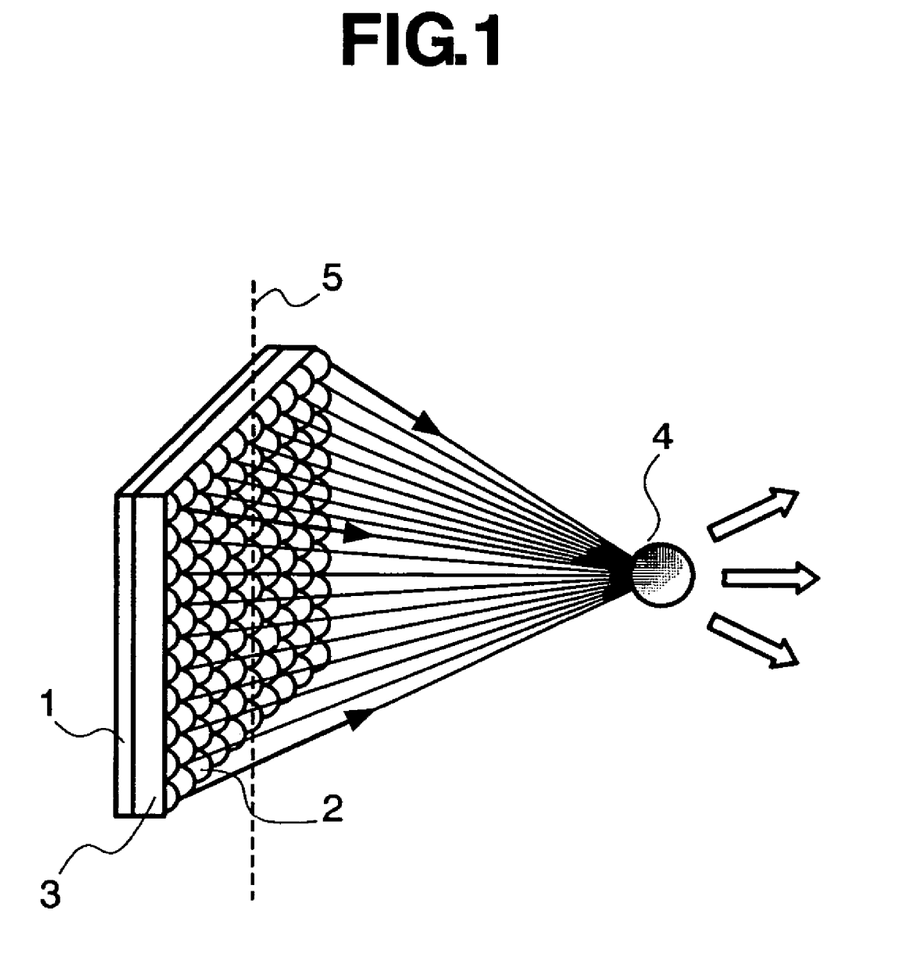
FIG. 1 is a view showing principles of integral photography.

With reference to FIG. 1, the integral photography method is configured of an image display device 1 and a lens array 3 formed of a large number of lenses 2. The integral photography method uses the plurality of lenses 2 to thereby generates a light spot 4 at an arbitrary site, in which a plurality of pixels are provided below the respective lenses 2, and one of the pixels indicates the light spot 4.

Figure 2:
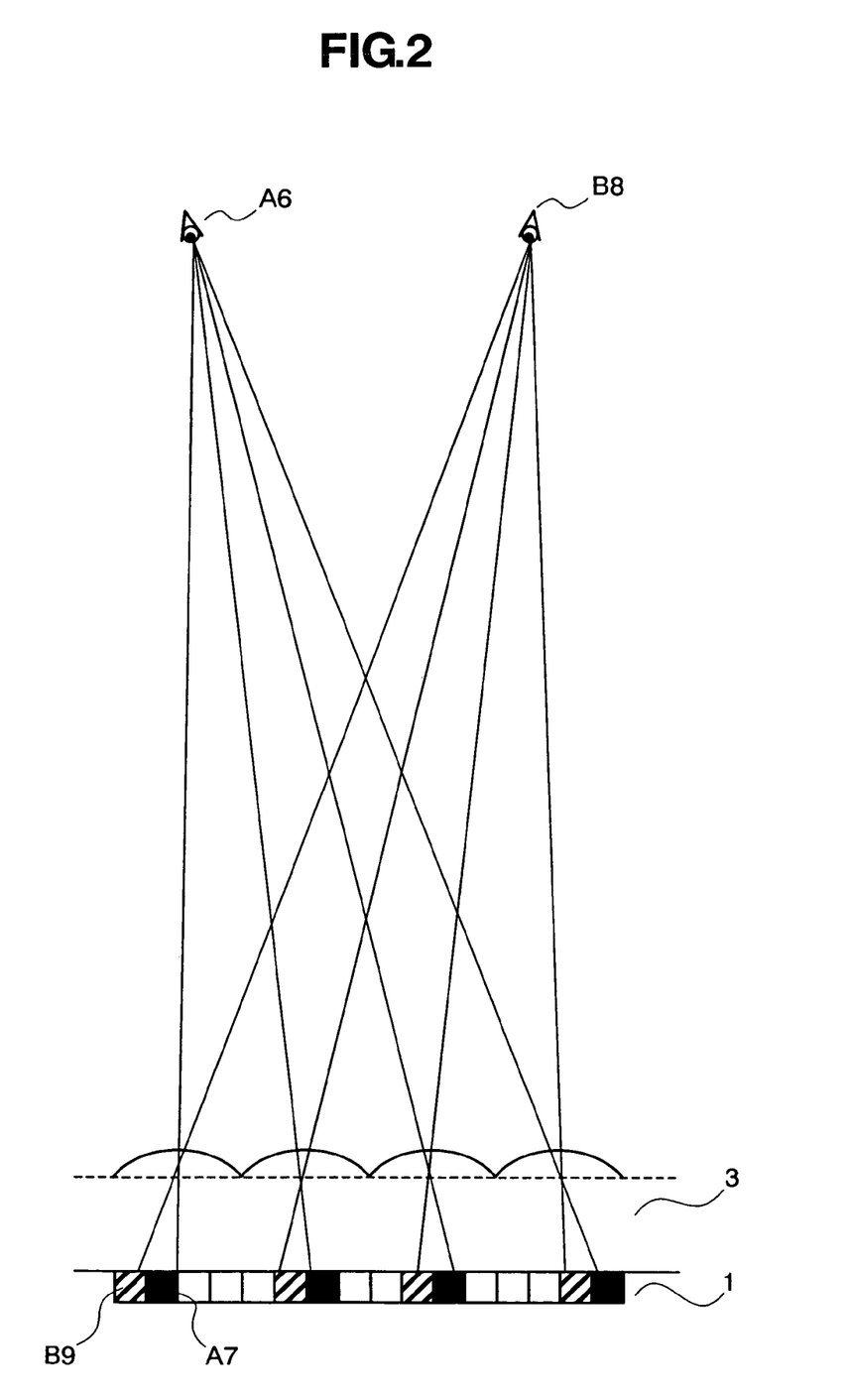
FIG. 2 is a cross sectional view sectioned by a plane inclusive of vertical lines to a lens array (3)

When the lens array 3 is seen from a view point A6 shown in FIG. 2 (horizontally in a cross sectional view taken along a dot line portion 5 shown in FIG. 1), pixels A7 are seen through respective lenses. When seen from a view point B8, pixels B9 are seen through respective lenses. Thus, the different pixels are seen from the left and right eyes, so that the stereogram can be implemented.

Figure 3:
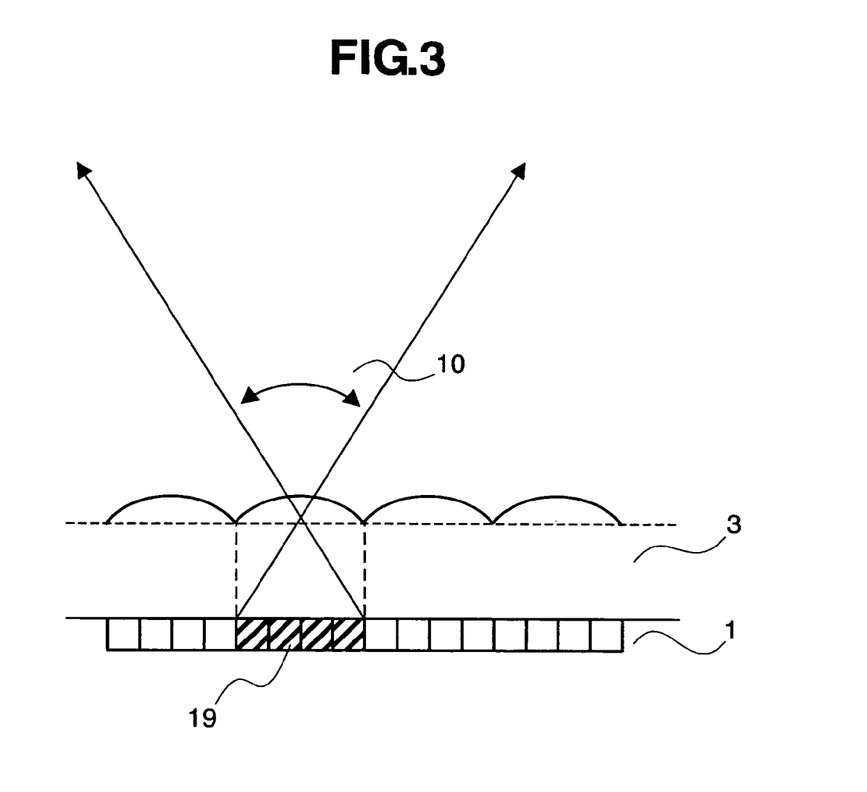
FIG. 3 is a view of a view range of coverage in units of one lens.

With the lens array, a similar autostereoscopic display can be configured by combination of a light beam control device array, in which a large number of light beam control devices for controlling light beams are arranged, with a flat display or an image display device for displaying images on films and the like, for example. Regarding the array arrangement of light beam control devices, there are employed many types, such as arrangement in a square matrix arrangement, closest filling arrangement for increasing the number of light beam control devices, or delta arrangement. In addition, in many cases, circular or hexagonal lenses are used in a lens array. As shown in FIG. 3, a displayable region 10 of the respective lens is the substantially the same in shape as a lens associated pixel 19. The lens associated pixel 19 contributes to the display of a stereoscopic image with an associated lens, and corresponds to the displayable region 10.

In addition, a technique is known'that has a lens array using ellipsoidal lenses to widen a view range (see Japanese Unexamined Patent Application Publication No. 07-7747 (or, 1995-7747)).

SUMMARY OF THE INVENTION

In comparison with other methods, however, the integral photography method has a problem of low resolution while being able to produce highly perspective display. This problem is attributed to the following. In the event of the above-described lens array arrangement, such as the square matrix arrangement, closest filling arrangement, or delta arrangement, the distance between adjacent lenses is substantially constant. Accordingly, the view range has a near circular shape, such as square or hexagonal shape, whereby regions permitting one eye to move along the vertical and horizontal directions are substantially identical to one another.

In a practical application, however, since the view range is preferably optimal corresponding to, for example, the usage and installation site of the display, the view range does not have to be circular. In addition, in many cases a horizontal view range is more necessary than a vertical view range. In such cases, a near-ellipsoidal view range is preferable.

Further, in order to widen the view range, the total number of lens has to be reduced, and the total number of lens-associated pixels has to be increased. However, since the total number of lens represents a two dimensional (2D) resolutions, such that the reduction in the total number of lens 2D resolution has the significance of a corresponding reduction in the 2D resolution.

The present invention is characterized in that uses a lens array that enables rendering a lens center position by using two unit vectors each having a component representing the value of an integer multiple of the pixel pitch, thereby to widen the horizontal view range.

BRIEF DESCRIPTION OF THE DRAWINGS

In the accompanying drawings.

DESCRIPTION OF THE PREFERRED EMBODIMENTS

Embodiments for widening the horizontal view range without causing a 2D resolution reduction will be described herebelow with reference to the drawings.

First Embodiment

Figure 13:
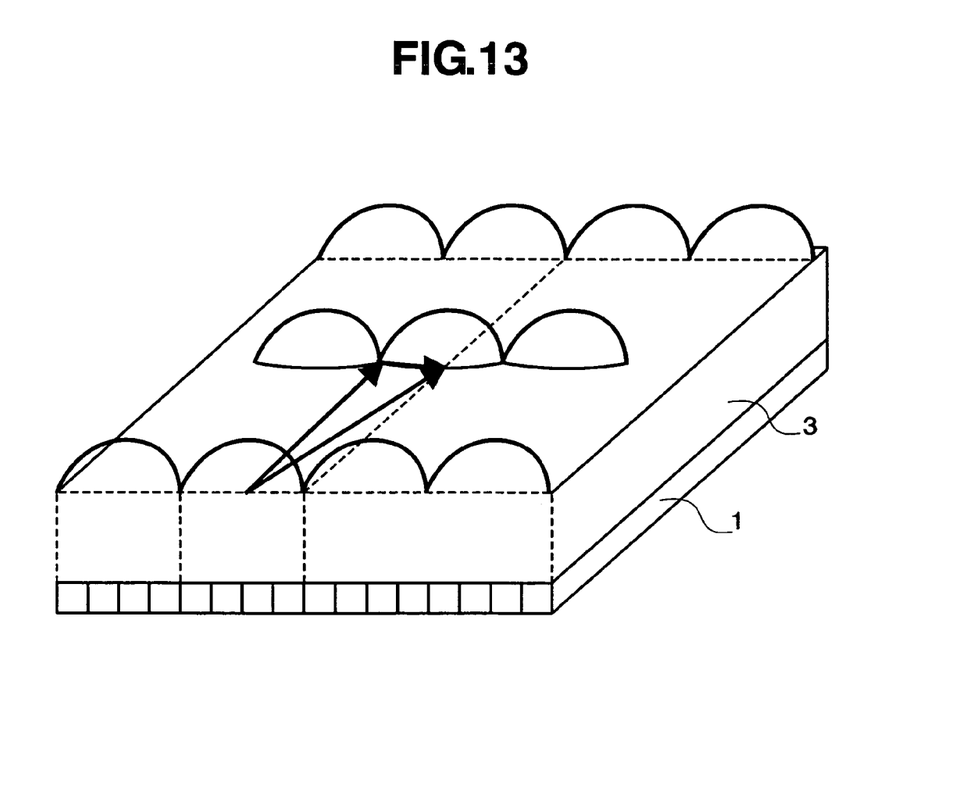
FIG. 13 is a view showing the configuration of the present invention.

FIG. 13 is a view of a basic configuration of the present invention. An autostereoscopic display using an integral photography method is configured of a lens array 3 and an image processing device 1. In the case that the image display device 1 is an LC (liquid crystal) display, the device is configured of an LC panel, a back light panel, and driving device. Alternatively, in the case that the image display device 1 is self-emitting display, such as an organic EL display, the device is configured of an organic EL panel and a driving device. The lens array 3 is not limited to exist on the front surface of the image processing device 1, but a color filter or the like may exist between the lens array 3 and the image display device 1. Alternatively, depending on the solid phase of the image display device 1, the lens array 3 may be included in the interior of the image display device 1.

Figure 14:
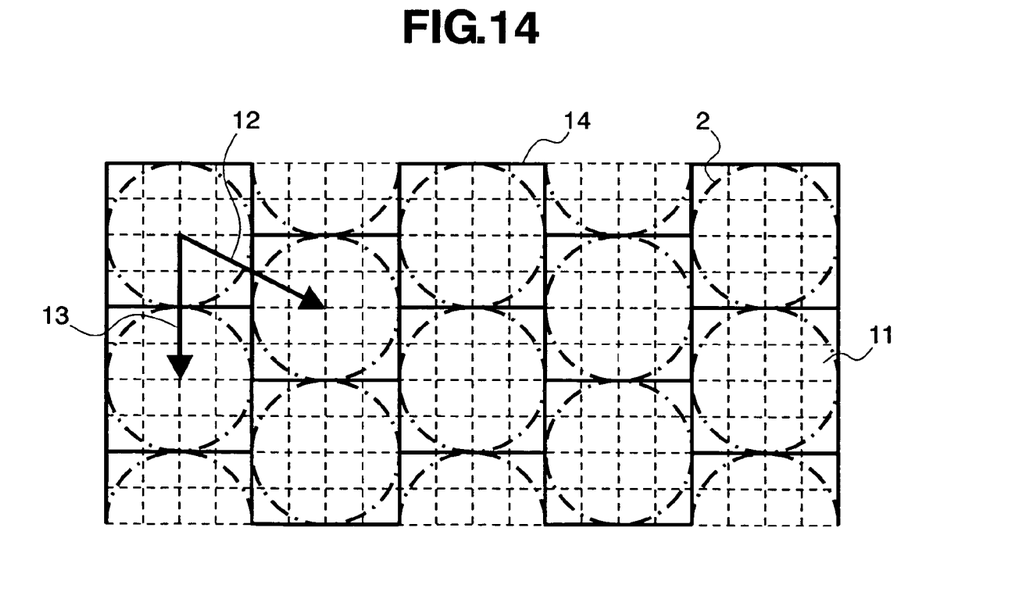
FIG. 14 is a view of a well-known lens arrangement.

A lens array is a light beam control device that controls light beams emitted from an image display device. FIG. 14 shows a lens arrangement in a conventional the lens array. Two unit vectors for defining the center-to-center pitch of lenses are represented by a unit vector A having the horizontal length of 4 and the vertical length of 2, and a unit vector B having the horizontal length of 0 and the vertical length of 4. In this arrangement, the vertical and horizontal view ranges are identical to one another. In addition, since human's two eyes are spaced away from one another at about a distance of 6 cm, a range in which the human face is horizontally movable in essence falls within the view range in which the two eyes are present. As such, there arises a problem in that the range in which the face can be horizontally movable is less than a range in which the face is vertically movable.

The unit vectors A and B will be described here in more detail. With a plane being taken into consideration, an arbitrary position can be represented by two unit vectors linearly independent of each other. A case is now assumed as follows. One of the two linearly independent unit vectors is defined to be a unit vector A, and the other is defined to be a unit vector B, in which the two unit vectors A and B have vertical and horizontal components each set to an integer multiple of an arbitrarily defined unit quantity. As the unit quantity, for example, a pixel pitch representing the center-to-center distance of adjacent pixels can be used. In this case, of the two unit vectors, a unit vector having a greater horizontal component is defined to be the unit vector A, and the other is defined to be the unit vector B. In description hereinbelow, the unit vector A is shown as the unit vector that represents the horizontal direction of the drawing, and the unit vector B is shown as the unit vector that represents the vertical direction of the drawing. However, the concept of, for example, horizontal or vertical aspects is a relative concept; and it is difficult to determine which is horizontal or vertical, depending on the unit vector. As such, even with such two unit vectors rotationally symmetric, the effectiveness of the present invention does not change. The effectiveness of widening the view range in a specific direction does not substantially change.

Figure 4:
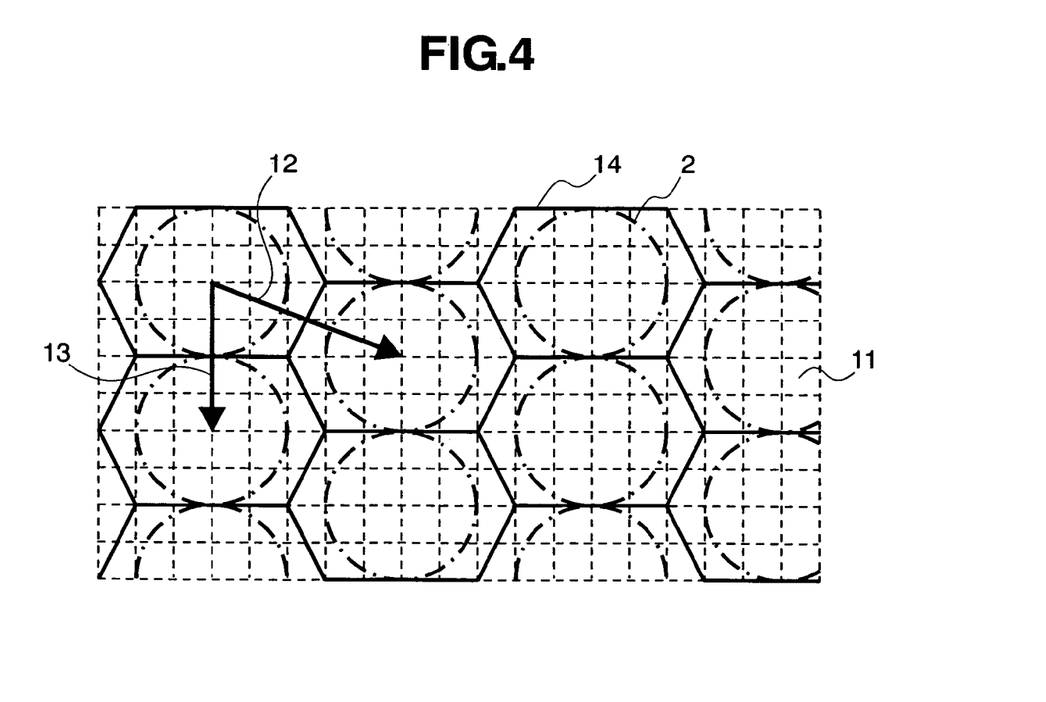
FIG. 4 is a view of a lens arrangement.

FIG. 4 shows a lens arrangement according to the present embodiment. More specifically, FIG. 4 shows an enlarged view, as viewed from a just upper position, of a part of the lens array 3, a respective matrix element 11 represents a unit length. In the present embodiment, one matrix element 11 corresponds to one pixel. Two unit vectors for defining the center-to-center pitch of lenses are represented by a unit vector A having the horizontal length of 5 and the vertical length of 2, and a unit vector B having the horizontal length of 0 and the vertical length of 4. The center of a respective lens 2 (lens center) is arranged in the position represented by the sum of respective integer multiples of the two unit vectors.

The lens center defined above indicates an optical axis center of the lens; and more specifically, it coincides with the center of the circle in the case of a simple spherical lens, but does not all time coincides with the lens center in the case of an aspherical lens. Even for a simple spherical lens, the lens center may be set to an off-center position of the lens by taking various aberrations into account. Aberrations include, for example, a spherical aberration regarding light imaged on the optical axis, which occurs because the position at which the light beam transect's with the optical axis is variable depending upon the height of the lens entrance pupil. The spherical aberration causes an offset from a focal distance acquired from a regular paraxial light beam. To correct the offset, the lens center position is offset to vary the distance between the lens and the image display device, thereby enabling improved display of stereoscopic images. Another type of aberration is an axial chromatic aberration that occurs because the position at which the light beam transects with the optical axis in a similar manner as in the case of the spherical aberration. In this case, similarly as in the case of the spherical aberration, the lens center position is offset to vary the distance between the lens and the image display device to correct the offset, thereby enabling improved display of stereoscopic images.

Twenty pixels are allocated to one lens 2, wherein four pixels are allocated in the vertical direction, and four or six pixels are allocated in the horizontal direction. A pixel region 14 associated with a single lens 2 is horizontally long hexagonal.

Figure 5:
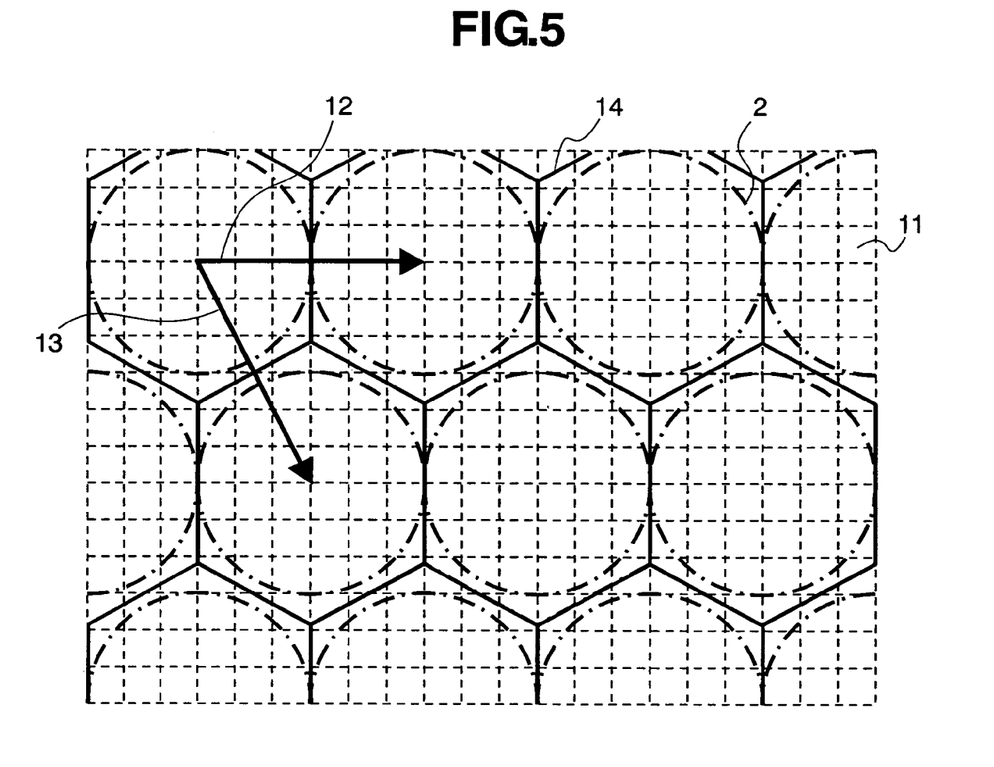
FIG. 5 is a view of a lens arrangement.

FIG. 5 shows a lens arrangement configured using a delta arrangement so that six pixels are arranged in the horizontal direction. Two unit vectors for defining the center-to-center pitch of lenses are represented with a unit vector A having a horizontal length of 6 and a vertical length of 0, and a unit vector B having the horizontal length of 3 and the vertical length of 6. In this case, the number of lens-associated pixels for one lens 2 is 36, such that, in comparison with the arrangement of FIG. 4, the number of lenses is half in the case of a lens array having the same area. Since the total number of lens is identical to the 2D resolution, the 2D resolution is reduced.

In the arrangement of FIG. 4, the size of the lens 2 itself may be set such as to make an entire hexagonal region as a visible region being covered by one lens. This is because the lens diameter is determined by, for example, the focal distance or refraction index of the lens, so that a hexagonal lens can be used. In this case, inter-lens spacings do not occur, and a lens array without non-lens portions is formed.

Figure 7:
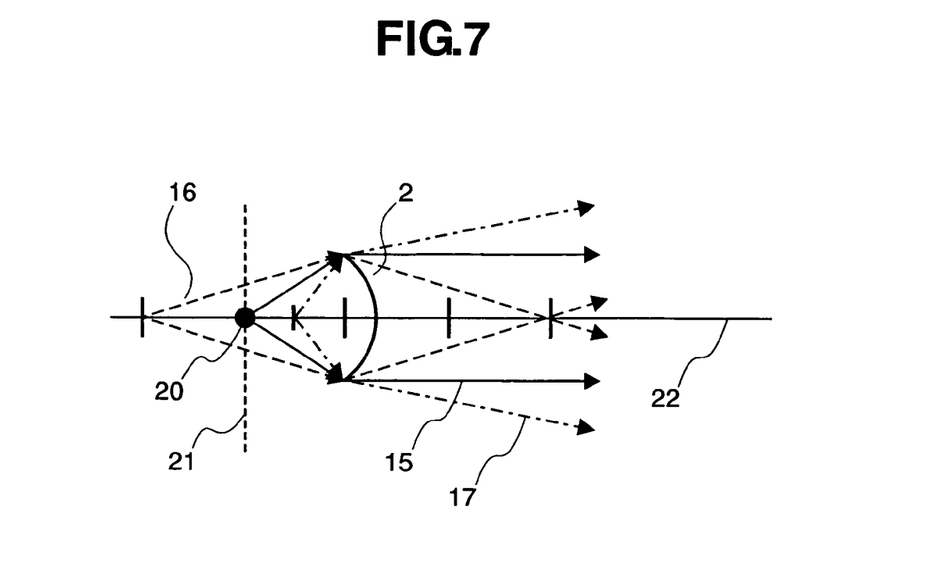
FIG. 7 is a view showing the relationship between a focal point and light beams.

FIG. 7 is a cross sectional view of an example state of a certain lens 2 as viewed from a lateral side, in which light incident from the image display device existing on the left side of the lens 2 is output to the right side of the lens.

According to the integral photography method, the image display device 1 is situated at a focal position 20 perpendicular to a focal plane 21, in which light is passed along a lens optical axis 22 and is output as parallel light like parallel light 15, thereby to enable image observation. In this case, even when the light is somewhat offset from the focal position 20, a stereoscopic image can be observed. As an allowable range of the offset from the focal position 20, the offset up to about 20% of the predetermined distance does not cause any problem in normal application.

However, a light beam 16 output from the point of twice the focal distance is imaged at the point of twice the focal distance, and a light beam 17 output from half the focal distance is imaged as a virtual image. Thus, the respective light beam expands greater than an ideal state. With the light beam 16, an actual observation region is very close to the lens array surface; and with the light beam 17, the pixels of the image display device are seen in enlarged states. Accordingly, in order to display the stereoscopic image consistent with the integral photography, the light beam has to be generated from the position between the light beams 16 and 17.

Figure 8:
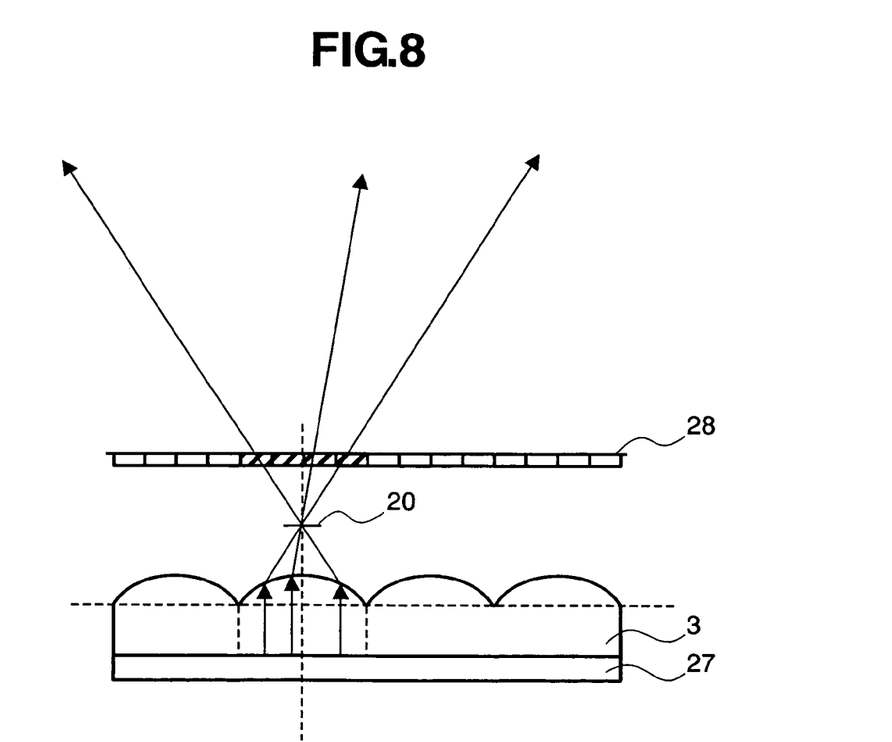
FIG. 8 is a view illustrative of integral photography using a parallel light source.

FIG. 8 shows a lens arrangement actually formed on a lens array having a lens arrangement that has the same unit vectors as those shown in FIG. 4. It is sufficient to form the arrangement by maintaining the same lens center position. For example, the lens diameter is increased if the curvature center of the lens is shifted in the direction of the normal.

The lenses are not limited only to the simple spherical lenses, but the lens array may be a compound lens array including aspherical lenses and formed laminating a plurality of lens arrays. The lenses of the lens array are not limited to be all the same.

The overall surface of the lens array may be a lens surface without non-lens portions; or alternatively, the surface of the lens array may include non-lens portions.

Figure 9:
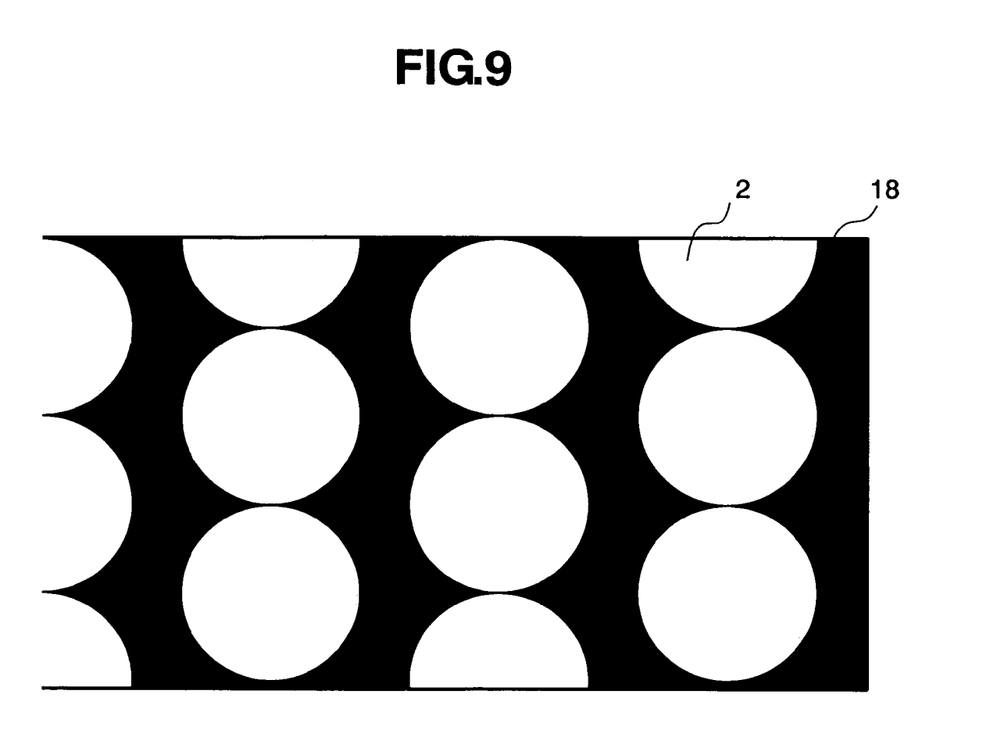
FIG. 9 is a view showing a lens array using circular lenses, in which non-lens portions are light shielded.

FIG. 9 is a view showing a lens array in which a non-lens portion 18 that is light shielded. A light shielding method for the non-lens portion may be of any type inasmuch as light from the rear side can be shielded, such as a coating or plating method. The color may be black, gray, or silver, or may be configured of a white color or multiple colors. A non-shielded portion permits 2D images to transmit without passing through the lens array, such that a mixed image of a stereoscopic image and a 2D image is presented. For this reason, the stereoscopic image is seen blurred or unclear. As such, a lens array without non-lens portions is preferred, if possible.

The respective light control device constituting the lens array 3 is not limited only to the lens, but may be replaced with a pinhole or color filter. Alternatively, the device may be replaced with, for example, a device having a structure permitting to observe only specific pixels when the display is observed from a view point, or an incident-angle dependent filter functioning for a light beam output from the display. Also the lens array itself may be a light control device array filled with the above-described light control devices.

The image display device 1 is not limited to the LC display, but may be any one of a CRT display, a plasma display, a FED, a projection display, an electronic paper, for example. Further, the display device need not be a flat display, but may be a display having a spherical or columnar surface.

Further, depending upon the principles of the image display device 1, a device configured of a light source and a pixel control section are separated. With such a device also, equivalent effectiveness can be obtained even when the lens array 3 is used between the light source and the pixel control section.

The pixel control section is a part of the image display device and is a device that controls the display of a single pixel. The pixel is a unit of an image being displayed on the image display device, and an actual image is configured by tone representations of multiple pixels. In the case of liquid crystal, each pixel represents a monochromatic red, blue, or green color, and the three pixels are arranged adjacent to one another. Ordinarily, one pixel is capable of displaying 256 tone levels. Thus, the image control section is used to control, for example, pixel display and tone levels.

FIG. 8 shows the relationship between the lens array 3 and the image processing device in the case that a parallel light source 27 is used for the light source. Parallel light (beam) output from the parallel light source 27 is refracted on the lens array 3, and is led to travel through a focal point 20. The light beam then travels a pixel control section 28, so that when a human eye is present in an arbitrary position, a light beam traveling through only one pixel of the image control section 28 is incident on the eye. The principles in this case are exactly the same as the principles of the integral photography, such that the lens array having the lens arrangement according to the present invention is effective.

A practical lens arranging method will be described herebelow.

Figure 16:
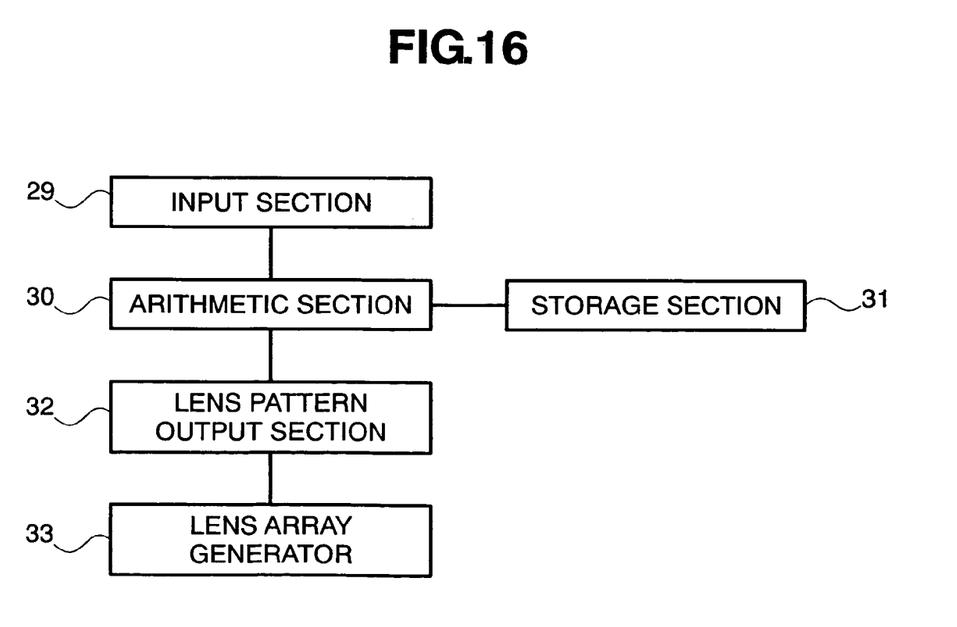
FIG. 16 is a view showing a hardware configuration for fabricating a lens array.

FIG. 16 shows a device for generating a practical lens array. The two unit vectors are input through an input section 29, and are stored into a storage section 31. In this case, the two unit vectors may be determined by being calculated by an arithmetic section 30. For example, a method is available to determine the lengths of the two unit vectors of FIG. 4 to be basic lengths. In more specific, a determination method is available, thereby to fix the unit vector B to have a horizontal component of 0 and a vertical component of 4. On the other hand, the unit vector A is fixed to have a vertical component of 4 and a horizontal component that have a length incrementable from 5 in correspondence with the increase in the horizontal view range. The arithmetic section 30 calculates center positions of the respective lenses in accordance with a flowchart of FIG. 10. Data such as current coordinates and the center position obtained in the calculation are stored in the storage section 31. When processing has been completed to the last, the lens center position is output by a lens pattern output section 32, and an actual lens array is generated by a lens array generator 33.

In the conventional delta arrangement, the horizontal component of the unit vector A and the vertical component of the unit vector B are identical in length to each other. However, according to the present invention, such restrictions are not imposed. According to the invention, it is sufficient if, for example, the horizontal component of the unit vector A has an integer value identical to or greater than the vertical component of the unit vector to increase (widen) the horizontal view range.

In practice, in the configuration using the spherical lenses case, when the offset from the optical axis of the respective lens-associated pixel is increased, the offset from the lens focal distance increased. As such, as in the case of the unit vector shown in FIG. 11, the length of the horizontal component of the unit vector A is limited to, twice the length of the vertical component of the unit vector B.

The lengths of the unit vectors A and B are predetermined to satisfy the above-described conditions, and are used as fixed values through the flow.

Figure 10:
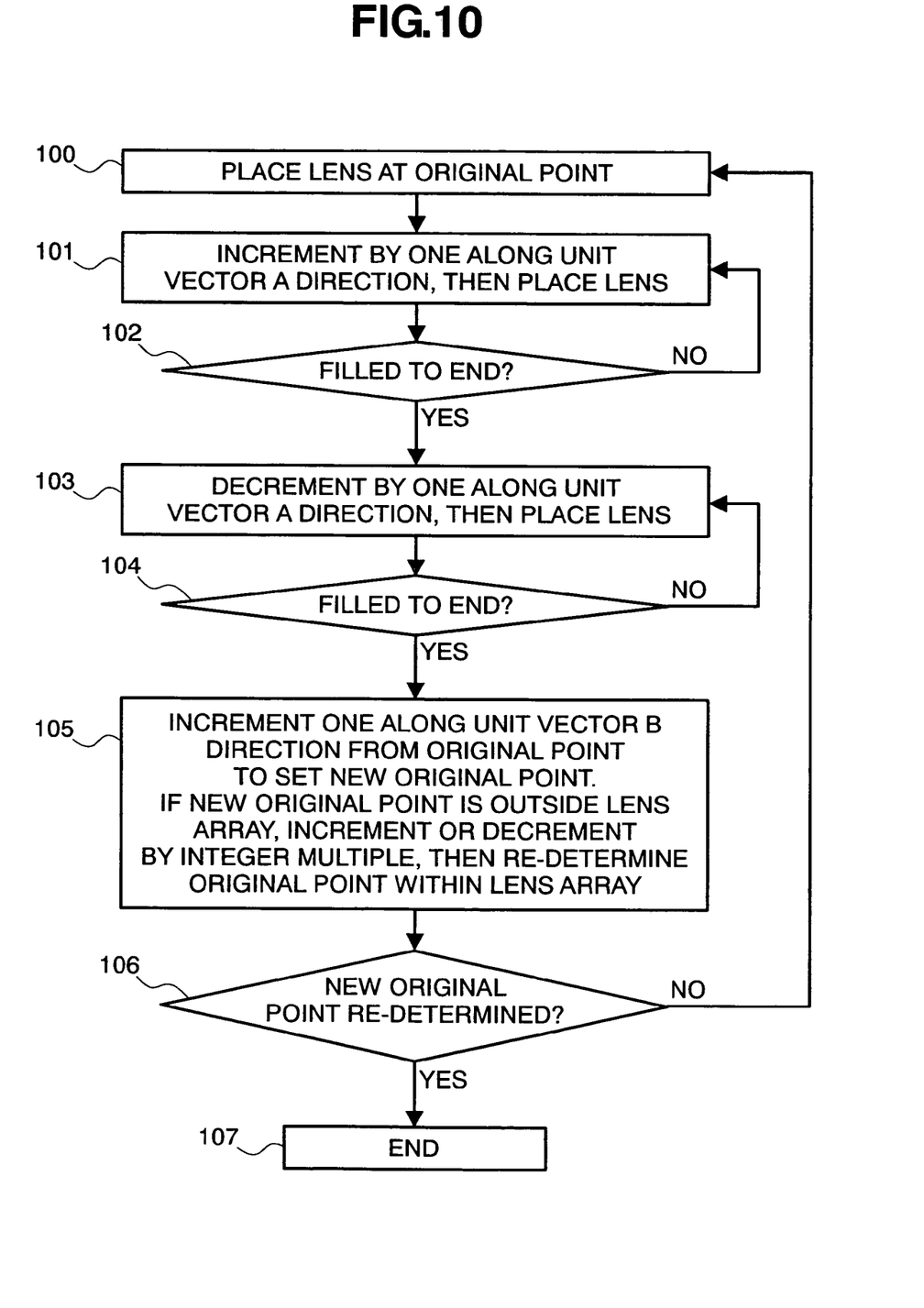
FIG. 10 is a setting flowchart of a lens arranging method.

With reference to FIG. 10, the flow of determining the lens arrangement will be described hereinbelow.

To begin with, an arbitrary point in a lens array is set to be an original point, and one lens is arranged at the original point in the center, in which the coordinates of the position are recognized to be current coordinates (at process 100). The current coordinates are variables that represent one set of coordinates.

Then, one vector of the length of the unit vector A is added to the current coordinates in the direction of the unit vector A, and one lens is arranged at the current coordinates in the center (at process 101).

The above-described processes are iterated, and it is verified whether the lenses are filled to the end of a substrate of the lens array (at process 102). If filled, then decrementation is done by one vector having the length of the unit vector A from the current coordinates in the counter-direction with respect to the original point, and one lens is arranged at a point determined in the center (at process 103).

The processes described above are iterated, and it is verified whether the lenses are filled to the end of the lens array substrate (at process 104). Then, incrementation is done by one vector having the length of unit vector B along the direction of the unit vector B from the original point, and a point determined thereby is determined to be a new original point. However, when an original point is present outside the lens array, incrementation or decrementation is done by an integer multiple of the unit vector A, thereby to re-determine the original point in the lens array (at process 105). After the new original point is determined, processing returns to process 100 (at process 106). If no original point does not present in the lens array, then processing terminates (at process 107).

Figure 15:
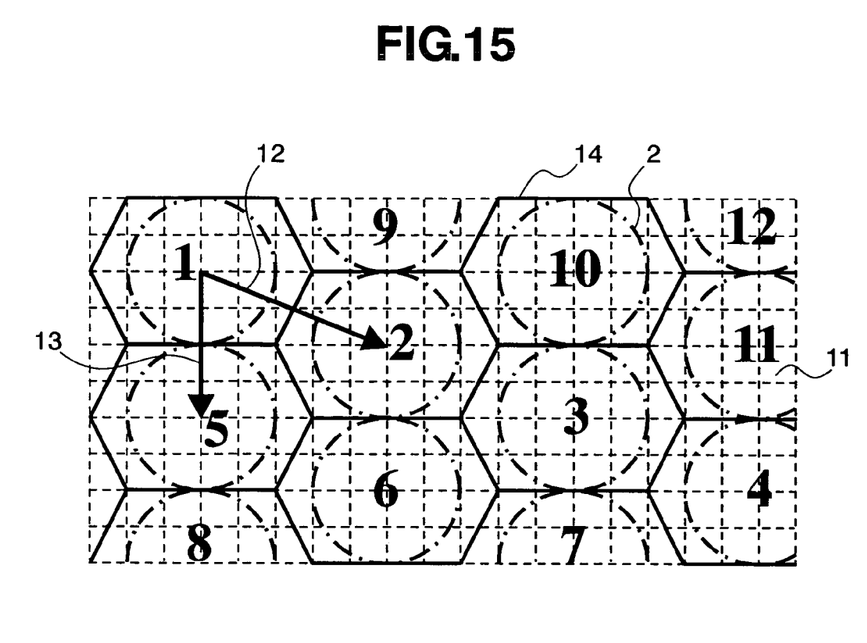
FIG. 15 is view showing a lens arrangement sequence.

The following will describe a process sequence of the lens arrangement in the event that the flow according the present invention is applied to the configuration of FIG. 15. A lens shown with numeral 1 (which hereafter will be referred to as "lens 1") is arranged at an original point in the center (lens center) (at process 100). Incrementation is done by one vector having the length of the unit vector A along the direction of the unit vector A, and the lens 2 is arranged (at process 101). Since the lenses are not filled to the end of the lens array substrate, processing returns to process (101) (at process 102). Incrementation is done by one vector having the length of the unit vector A along the direction of the unit vector A, and a lens 3 is arranged (at process 101). Since the lenses are not filled to the end of the lens array substrate, processing returns to process (101) (at process 102). Incrementation is done by one vector having the length of the unit vector A along the direction of the unit vector A, and a lens 4 is arranged (process 101).

Since the lenses are filled to the end of the lens array substrate, processing proceeds to process (103) (at process 102). In this case, although decrementation is done from the original point along the direction of the unit vector A, since the end has already been reached, the lens is not arranged (at process 103). Since the lenses are filled to the end of the lens array substrate, processing proceeds to process (105) (at process 104). Incrementation is done by one vector having the length of the unit vector B along the direction of the unit vector B, whereby a new original point is determined (at process 105). Since the new original point has been determined, processing returns to process (100) (at process 106). A lens 5 is arranged at the new original point in the center (lens center) (at process 100). Incrementation is done by one vector having the length of the unit vector A along the direction of the unit vector A, and a lens 6 is arranged (at process 101). Since the lenses are not filled to the end of the lens array substrate, processing returns to process (101) (at process 102). Incrementation is done by one vector having the length of the unit vector A along the direction of the unit vector A, and a lens 7 is arranged (at process 101). Since the lenses are filled to the end of the lens array substrate, processing proceeds to process (103) (at process 102). In this case, although decrementation is done from the original point along the direction of the unit vector A, since the end has already been reached, the lens is not arranged (at process 103).

Since the lenses are filled to the end of the lens array substrate, processing proceeds to process (105) (at process 104). Incrementation is done by one vector having the length of the unit vector B along the direction of the unit vector B, whereby a new original point is determined (at process 105). Since the new original point has been determined, processing returns to process (100) (at process 106). A lens 8 is arranged at the new original point in the center (lens center) (at process 100). Although incrementation is attempted to be done by one vector having the length of the unit vector A along the direction of the unit vector A, since the end has already been reached, nothing is arranged (at process 101). Since the lenses are filled to the end of the lens array substrate, processing proceeds to process (103) (at process 102). Although decrementation is done from the original point along the direction of the unit vector A, since the end has already been reached, the lens is not arranged (at process 103).

Since the lenses are filled to the end of the lens array substrate, processing proceeds to process (105) (at process 104). Although incrementation is attempted to be done by one vector having the length of the unit vector B along the direction of the unit vector B, the end of the lens array substrate has already been reached. As such, decrementation is done by two vectors having the length of the unit vector B along the direction of the unit vector A, and further, incrementation is done by one vector having the length of the unit vector A along the direction of the unit vector A, whereby a lens position shown with numeral 9 is determined to be a new original point (at process 105). Since the new original point has been determined, processing returns to process (100) (at process 106). The lens 9 is arranged at the new original point in the center (lens center).

Since the lenses are not filled to the end of the lens array substrate, processing returns to process (101) (at process 102). Incrementation is done by one vector having the length of the unit vector A along the direction of the unit vector A, and a lens 10 is arranged (at process 101). Since the lenses are not filled to the end of the lens array substrate, processing returns to process (101) (at process 102). Incrementation is done by one vector having the length of the unit vector A along the direction of the unit vector A, and a lens 11 is arranged (process 101).

Since the lenses are filled to the end of the lens array substrate, processing proceeds to process (103) (at process 102). In this case, although decrementation is done from the original point along the direction of the unit vector A, since the end has already been reached, the lens is not arranged (at process 103).

Since the lenses are filled to the end of the lens array substrate, processing proceeds to process (105) (at process 104). Decrementation is done by one vector having the length of the unit vector B along the direction of the unit vector B, and further, incrementation is done by two vectors having the length of the unit vector A along the direction of the unit vector A, whereby a lens position shown with numeral 12 is determined to be a new a new original point (at process 105). Since the new original point has been determined, processing returns to process (100) (at process 106). A lens 12 is arranged at the new original point in the center (lens center) (at process 100). Although incrementation is attempted to be done by one vector having the length of the unit vector A along the direction of the unit vector A, since the end of the lens array substrate is reached, nothing is arranged (at process 101).

Since the lenses are filled to the end of the lens array substrate, processing proceeds to process (103) (at process 102). Although decrementation is done from the original point along the direction of the unit vector A, since the end has already been reached, the lens is not arranged (at process 103). Since the lenses are filled to the end of the lens array substrate, processing proceeds to process (105) (at process 104). Although incrementation is attempted to be done by one vector having the length of the unit vector B along the direction of the unit vector B, since the end of the lens array substrate is reached, no arrangement position is present, so that processing proceeds to process (106) (at process 105). Since no new original point is not determined, processing proceeds to process (107) (at process 106) and then terminates (at process 107).

The above-described method is an example of the lens arranging method, such that the lenses may be arranged by a method other than the above-described method. When the same unit vectors are used, there is attained the same positional relationship with respect the original point.

Figure 6:
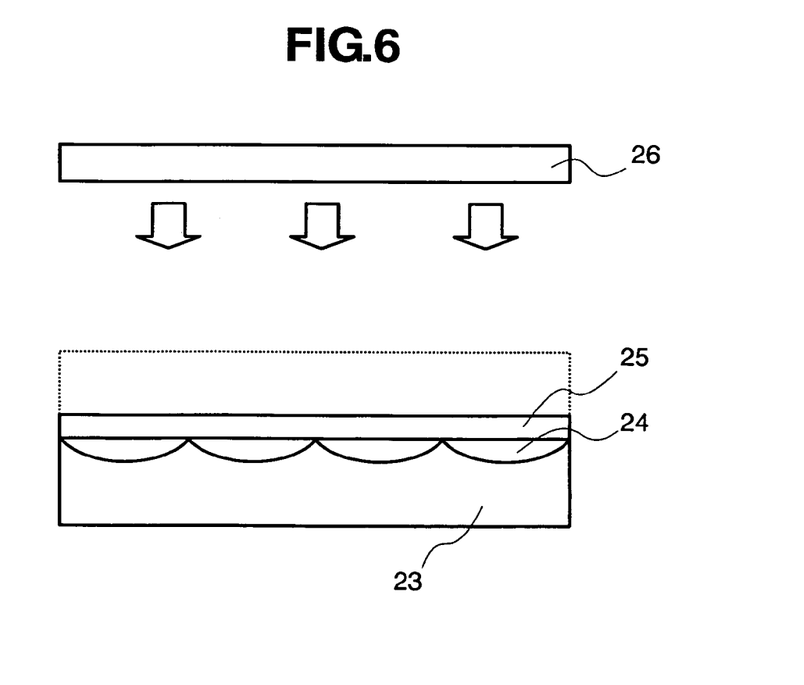
FIG. 6 is a view of a lens array generation apparatus.

FIG. 6 shows a practical example of a lens array generation apparatus. An ultraviolet (UV) curable resin is placed over a stamper 23 serving as a die, and a substrate 25 being used as a base of the lens array is placed thereover. The substrate 25 is used as the lens array, such that it is achromatic and transparent as a matter of course. The substrate 25 is cured by irradiation of UV light of a UV lamp 26 from the rear side of the substrate 25. Many other lens array generation methods are available, and the method can be replaced with any one of other available methods.

Second Embodiment

Figure 11:
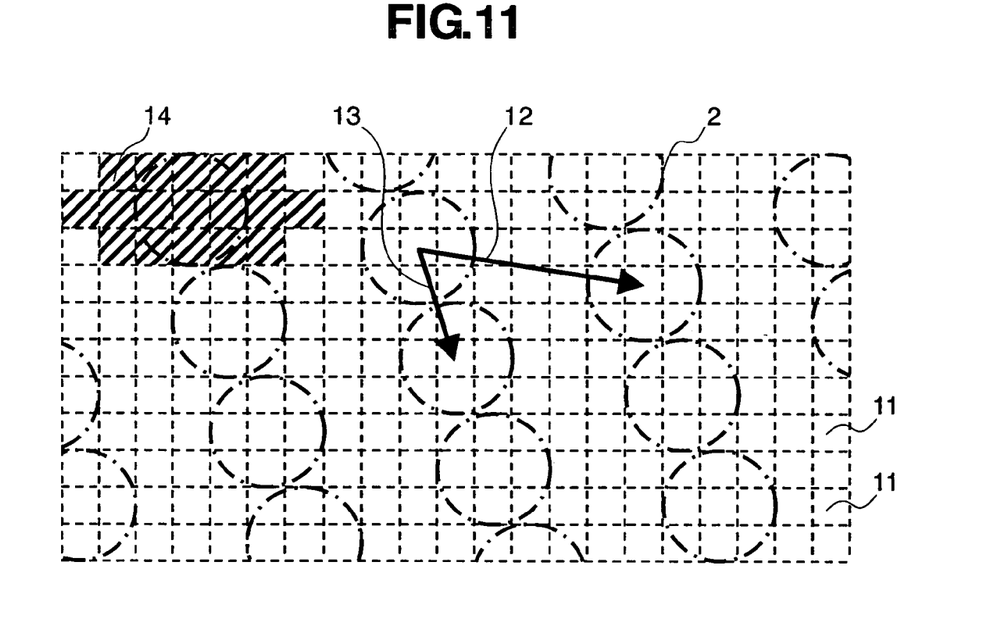
FIG. 11 is a view showing a lens arrangement.

FIG. 11 is a view showing a lens arrangement. More specifically, FIG. 11 is an enlarged view of a part of a lens array 3 as viewed in the direction of the normal of the lens array surface. A matrix element 11 represents the unit length, and one matrix element 11 corresponds to one pixel of an image processing device 1. Two unit vectors are respectively represented by unit vectors A and B, the unit vector A having a horizontal length of 6 and a vertical length of 1, and unit vector B having a horizontal length of 1 and a vertical length of 3. The center of the respective lens 2 (lens center) is arranged in a position represented by an integer coefficient linear combination. The lens center indicates an optical axis center of the lens; and more specifically, it coincides with the center of the circle in the case of a simple spherical lens, but does not all time coincides with the lens center in the case of an aspherical lens. Even for a simple spherical lens, the lens center may be set to an off-center position of the lens by taking various aberrations into account.

Seventeen pixels are allocated in units of one lens 2, in which three pixels are allocated in the vertical direction and five or seven pixels are allocated in the horizontal direction. A pixel region 14 associated with one lens 2 is horizontally long hexagonal. In the case of seven view points along the vertical and horizontal directions, ordinarily about 25 view points are necessary, but 17 view points are set in the present embodiment. Of course, a configuration can be formed in which the two unit vectors are represented by a unit vector A, which has a horizontal length of 7 and a vertical length of 1, and a unit vector B having the same components as those in the present embodiment.

Third Embodiment

Figure 12:
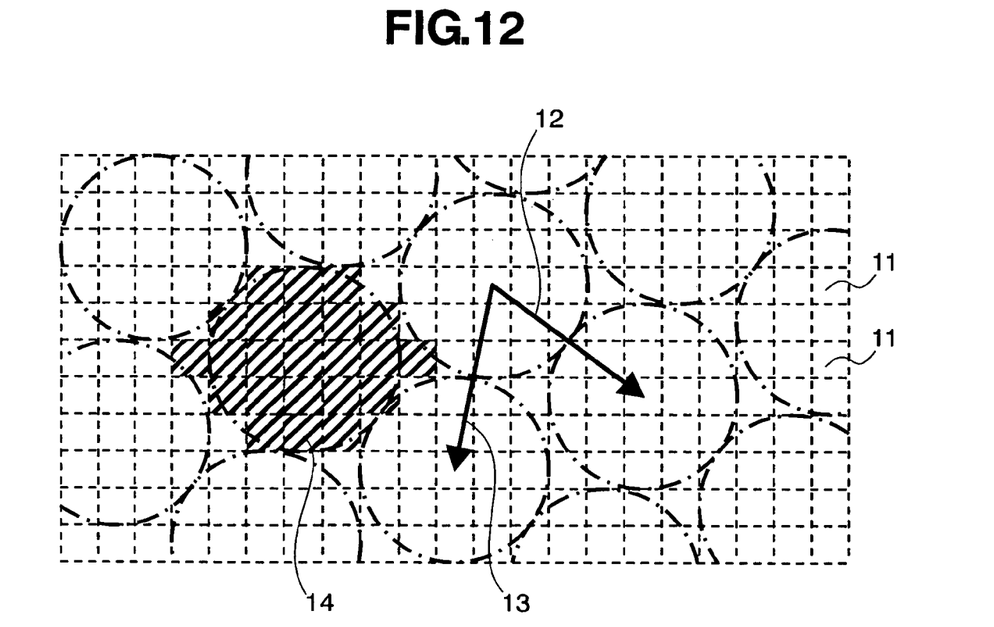
FIG. 12 is a view showing a lens arrangement.

FIG. 12 is a view showing a lens arrangement. More specifically, FIG. 12 is an enlarged view of a part of a lens array 3 as viewed in the direction of the normal of the lens array surface. A matrix element 11 represents the unit length, and one matrix element 11 corresponds to one pixel of an image processing device 1. Two unit vectors are respectively represented by unit vectors A and B, the unit vector A having a horizontal length of 4 and a vertical length of 3, and unit vector B having a horizontal length of −1 and a vertical length of 5. The center of the respective lens 2 (lens center) is arranged in a position represented by an integer coefficient linear combination. The lens center indicates an optical axis center of the lens; and more specifically, it coincides with the center of the circle in the case of a simple spherical lens, but does not all time coincides with the lens center in the case of an aspherical lens. Even for a short spherical lens, the lens center may be set to an off-center position of the lens by taking various aberrations into account.

Twenty three pixels are allocated in units of one lens 2, in which five pixels are allocated in the vertical direction and three or five or seven pixels are allocated in the horizontal direction. A pixel region 14 associated with one lens 2 is horizontally long hexagonal. In the case of seven view points along the vertical and horizontal directions, ordinarily about 25 view points are necessary, but 23 view points are set in the present embodiment.

Lens arrays are used in various other ways, such as in connector portions of optical communication cables and for homogenizing light sources of projectors. As such, lens arrays are used as well for cases requiring control of regions where light beams can expand in the right and left directions. Further, lens arrays are necessary for photography of autostereoscopic display and can therefore be used therefor.

In an autostereoscopic display using the lens array according to the present invention, the optical-axis center-to-center distance of the respective lenses is set as the lens pitch, and the effective view range can be arbitrarily regulated by changing the lens pitch. Consequently, the vertical view range can be reduced and the horizontal view range can be increased without reducing the 2D resolution.

What is claimed is:

1. A lens array generation apparatus comprising:
   an input section that inputs a first unit vector and a second unit vector that are linearly independent of one another on an arbitrary plane, the first unit vector having a horizontal component greater than the second unit vector;
   a storage section that stores the input two unit vectors;
   an arithmetic section that calculates an arrangement of lenses on the lens array by using the two unit vectors;
   a lens pattern output section connected to the arithmetic section; and
   a lens array generator connected to the lens pattern output section, wherein:
   the arithmetic section is capable of calculating the two unit vectors;
   the arithmetic section performs generation so that the horizontal component of the first unit vector is within a range in magnitude from at least one times to at most two times a vertical component of the second unit vector;
   center position information and a curvature radius value of a respective lens that have been calculated in the arithmetic section are input to the lens pattern output section; and the lens array generator generates the lens array in accordance with the center position information and the curvature radius value of the respective lens.

2. A lens array generator according to claim 1, wherein:
the arithmetic section determines the center position information of the respective lens in a manner that:
an arbitrary point on the lens array is recognized to be a first original point, and a center position of the respective lens is determined in units of a position of one vector having the direction and length of the first unit vector from the first original point; and
a position of one vector having the direction and length of second unit vector from the original point is recognized to be a second original point, and the center position of the respective lens is determined in units of a position of one vector having the direction and length of the first unit vector from the second original point.

3. A display apparatus having a lens array generated by the lens array generation apparatus according to claim 2 and an image display device, wherein the length of the unit vector is in a range of from at least one-half times to at most two times a focal distance of the lens constituting the lens array.

4. A display apparatus according to claim 3, wherein:
the image display device includes a light source and a pixel control section; and
a focal position exists between the lens array and the image control section.

5. A lens array generated by the lens array generation apparatus according to claim 2, wherein a positional relationship between arbitrary lens centers is represented a linear combination of integer multiples of the two unit vectors.

6. A lens array generated by the lens array generation apparatus according to claim 2, wherein the length of components in each unit vectors is determined in accordance with an integer multiple of an inter-pixel pitch on the display device.

* * * * *